Feb. 14, 1939.  I. T. FAUCETT  2,147,402
ELECTRIC CABLE
Filed Nov. 22, 1932   2 Sheets-Sheet 1

INVENTOR
Irving T. Faucett
BY
HIS ATTORNEYS

Patented Feb. 14, 1939

2,147,402

UNITED STATES PATENT OFFICE 2,147,402

ELECTRIC CABLE

Irving T. Faucett, Westerleigh, N. Y., assignor to General Cable Corporation, New York, N. Y., a corporation of New Jersey Application November 22, 1932, Serial No. 643,814

9 Claims. (Cl. 247—3)

This invention relates to means for transmitting and distributing electric currents, and more particularly to electric cables and cable systems. It is an object of the invention to provide an improved cable and cable system. Other objects and advantages of the invention will appear hereinafter.

The invention will be best understood from the following description when read in the light of the accompanying drawings of certain specific embodiments of the invention, the scope of which latter will be more particularly pointed out in the appended claims.

Figure 1:
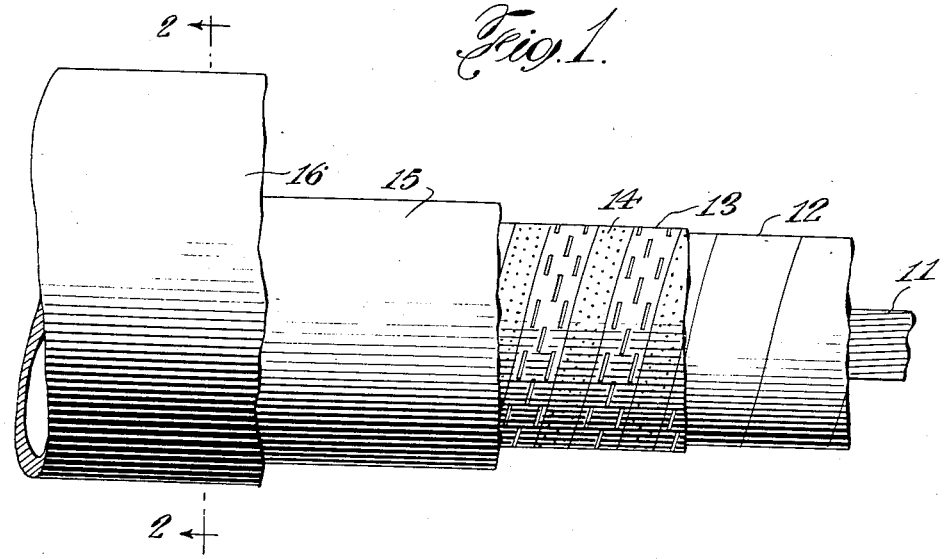
Fig. 1 is an elevation of a short length of single conductor power cable, the parts being cut away progressively greater distances to disclose the construction.

In transmitting electric power underground at high voltages the conductors customarily are enclosed within jackets of porous insulation, for example paper, which is impregnated with an insulating compound or fluid oil. In the past these insulated conductors usually have been encased within lead sheaths and drawn into conduit ducts. The lead sheath adds greatly to the weight of the cable, and also reduces its flexibility. Furthermore, the lead sheath is not elastic, and the sheath stretches when the cable is bent, and also when the insulating compound expands during heating of the cable while in service. When the cable cools the insulating compound contracts in volume, but the lead sheath does not contract, and gaseous spaces or voids are formed within the cable sheath. Ionization occurs in the spaces or voids formed by the stretching of the sheath which ultimately may result in the breakdown of the cable.

It has been proposed by H. W. Fisher and R. W. Atkinson, United States Letters Patents 1,524,124, January 27, 1925, and 1,651,590, December 6, 1927, to eliminate the danger of formation of gaseous spaces or voids in the insulation of lead sheathed cables by continuously maintaining a high pressure on the cable insulation. These prior patents teach that the pressure on the insulation may be applied interiorly of the sheath by connections to suitable reservoirs or to a pressure pipe extending along the cable either within the cable sheath or exteriorly thereof. In such a system the sheath should be reinforced against internal pressure either by choosing a suitable lead alloy, or by employing a steel or bronze tape wrapping over the sheath and then applying a second covering of lead. The patents also teach that alternatively the pressure on the insulation may be applied exteriorly of the cable sheath by placing the cable within an air-tight pipe or conduit and maintaining a high pressure in the space between the cable and the wall of the pipe.

In distributing electrical power in high buildings it is customary to transmit current at high voltages through vertical riser cables up to the floor where it is most economical to transform the voltage down and distribute current either through the building or several floors thereof. Impregnated paper cable doss not lend itself satisfactorily to this use because the impregnating compound would migrate from the top to the bottom end of the cable. This migration of the compound would build up a high hydrostatic head in the lower end of the cable and would result in failure of the cable. Heretofore, vertical riser cables usually have been insulated with rubber or varnished cambric, or a combination thereof, and have been armored with a heavy and expensive steel wire armor.

There is an increasing use of cables for telephone transmission over great distances. Desirably such cables are placed underground, and heretofore the insulated conductors have been sheathed with lead and armored with steel in order to adequately protect the circuits. Lead is subject to corrosion in the ground, and in lead sheathed cables it has been found desirable to provide means for giving a signal upon failure of the lead sheath. Telephone cables have been divided interiorly by fluid stops into sections in each of which gas is maintained under pressure for the purpose of giving a warning signal whenever the sheath is perforated and the gas pressure is reduced.

The present invention carries forward the thought clearly disclosed in the Fisher and Atkinson patents already referred to. The Fisher and Atkinson patents contemplated the use of an ordinary lead sheathed cable within a pipe containing a body of fluid under high pressure. According to the present invention the insulated conductor or conductors forming the cable are sheathed with an elastic insulating material and then drawn into a fluid-tight pipe or other conduit which is larger than the sheathed cable. Between the elastic sheath of the cable and the wall of the pipe there is introduced a body of fluid which is maintained under pressure while the cable is in service. This improved construction is relatively inexpensive, and has both electrical and mechanical advantages in power and communication cables.

Figure 2:
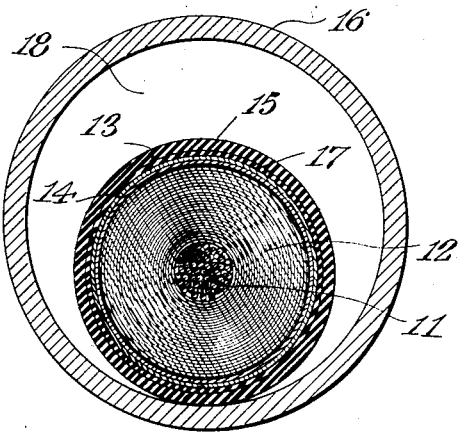
Fig. 2 is a cross section through the cable of Fig. 1 substantially on the line 2—2.

Referring first to Figs. 1 and 2, there is shown by way of example a single conductor power cable comprising a conductor 11 which has a surrounding wall 12 of insulation. Conveniently, the wall 12 comprises a plurality of overlying layers of helically wrapped insulating tapes, for example paper. Over the insulation 12 is a relatively thin electrostatic shielding layer 13, 14, which is grounded at intervals in the installation. In the illustrative embodiment this shielding layer comprises a metallic tape 13 and a metallized paper tape 14 which are wound helically about the insulated conductor together and in overlapping relation, preferably so that the edges of the adjacent turns of the metal tape 13 lie close together with the metallized paper tape 14 extending between the edges of the metal tape so as to underlie and overlie adjacent turns of the metal tape. This construction is described more fully and claimed in a copending application of mine.

Enclosing the insulated and shielded conductor is a sheath 15, desirably comprising an elastic insulating material. The insulated conductor may be impregnated with an insulating fluid, for example an oil or viscous oily compound. This impregnation of the insulated conductor may be performed either before or after the sheath 15 has been applied. Known rubber compounds deteriorate rapidly when in contact with oil, and therefore when oil is used it is necessary to make the sheath 15 of a material which does not deteriorate when in contact with oil, or at least to provide the sheath 15 with an inner surface 17 which is unaffected by the oil. Also the sheath 15 should afford mechanical protection to the insulated conductor during shipment and installation.

One suitable oil proof material for the cable sheath is, for example, a cured plastic compound containing as its main ingredient the substance sold under the trade name of "Thiokol". "Thiokol" consists mainly of organically combined sulfur, and may be formed by the interaction of halogen additive compounds of olefins with poly-sulfides, for example by the interaction of ethylene dichloride and an alkali polysulfide such as sodium polysulfide. Merely for convenience in this description we will use the name "Thiokol" in referring to a reaction product of alkaline polysulfides with olefins of the general formula $C_nH_{2n}$. This substance, which is a combination of carbon, hydrogen and sulfur, has certain physical properties resembling those of rubber, but differs from rubber in that it is oil proof.

In its pure form "Thiokol" presents certain difficulties in working and curing which make it unsuitable for use as a cable sheath. However, "Thiokol" may be compounded with other materials, including a relatively small proportion of rubber, in much the same manner that rubber is compounded. Some of these "Thiokol" compounds, when cured, provide an elastic non-porous product having an extremely high resistance to deterioration by oil. One such compound which is suitable for use as the cable sheath in the present invention, cured for 50 minutes at 287° F., is as follows:

| | | |
|---|---|---|
| "Thiokol" | gm. | 500 |
| Smoked sheets | do | 50 |
| Diphenyl-guanidine | do | 4.5 |
| Orthotoluidine | c. c. | 5 |
| Zinc oxide | gm. | 50 |
| Talc | do | 100 |
| Stearic acid | do | 5 |
| Neozone D | do | 5 |
| Carbon black | do | 50 |
| Sulfur | do | 5 |

For convenience in description, the word "Thiokol" is used herein broadly to include compounds or mixtures containing a high proportion of "Thiokol", in much the same manner that the word "rubber" is used to denote various compounds having rubber as their principal ingredient.

As may be seen in Fig. 2, the elastic sheath may comprise a layer 17 of oil proof material, for example "Thiokol", and an overlying layer 15 of different material, such as rubber. The sheath so provided is flexible and light in weight as compared to the usual lead sheath, and at the same time furnishes good mechanical protection to the insulated conductor.

In cable for use at high voltages the filling of the cable with the insulating fluid desirably includes as the final steps the forcing of an additional quantity of fluid under pressure into the cable sheath so as to expand the sheath slightly, and then the sealing of the sheath while so expanded. This procedure provides a small amount of the insulating fluid between the shielded conductor and the cable sheath which serves as a reservoir to supply insulating fluid to the porous insulation when the temperature of the cable is lowered below the temperature at the time of impregnation.

In installing the cable a pipe 16 having a high resistance to internal pressure, for example a steel pipe, which desirably is materially larger than the cable, is laid along the route of the cable, and the sheathed cable is drawn into this pipe. The space 18 between the sheathed cable and the wall of pipe 16 is filled with a fluid which is maintained under pressure when the cable is in service. The pressure fluid may be either a liquid or a gas, but the latter ordinarily will be preferable. For example, air may be used.

Desirably the pressure on the fluid in the space 18 is sufficiently high so that at all points in the cable installation and for all temperatures to which the cable will be subjected there is always a positive pressure tending to collapse the cable sheath and force the insulating fluid within the sheath into the porous insulation 12. This pressure may be very high as compared to the pressures used in oil-filled cable systems, for example of the order of fifteen atmospheres.

Figure 3:
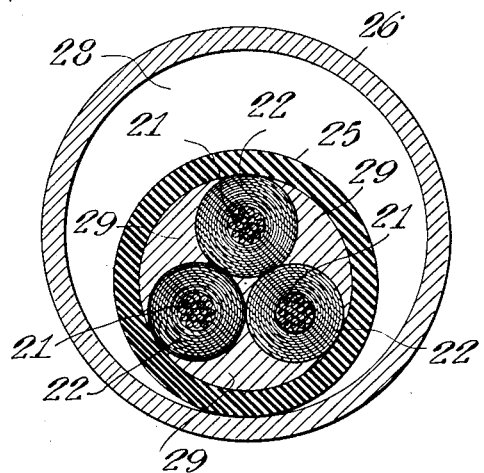
Fig. 3 is a cross section through a three conductor power cable.

Fig. 3 shows in cross section a three conductor power cable. In this embodiment the conductors 21 are each surrounded with a sheath 22 of insulation, for example paper. The three insulated conductors are assembled, usually with suitable filler material 29, and enclosed within the elastic sheath 25. The sheathed cable is drawn into the pipe 26, and the pressure fluid is introduced into the space 28 between the sheathed cable and the wall of the pipe.

In the drawings the single conductor cable is provided with the shielding layer 13, 14, while in the three conductor cable the insulated conductors are not shielded. It will be understood that the shielding may be omitted in single conductor cable, or may be used in the three conductor cable, as desired. The use of the shielding layer is believed to be almost universal in high voltage cable at the present time, but in the cable of the present invention the shielding layer may be unnecessary in some instances because the elastic sheath and the high pressure on the cable prevent the formation of ionizable spaces between the insulated conductor and the cable sheath. Furthermore, under pressures which are materially above atmospheric, the danger of ionization in any gaseous spaces within the cable is greatly reduced.

The present invention permits the use of impregnated paper insulated cable for the vertical riser cables in high buildings. The fluid in the space between the cable and the wall of the enclosing pipe may be kept under sufficiently high pressure to provide a pressure balance and prevent draining of the impregnating material to the lower end of the cable. It may be desirable, for example in a cable installation having wide differences in elevation, to use a liquid as the pressure fluid, for example the same liquid as is used for impregnating the conductor insulation, or water.

Figure 4:
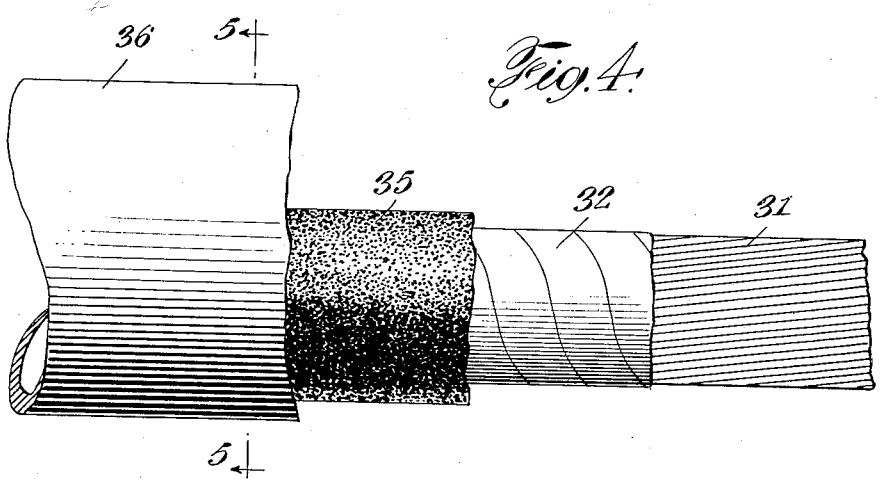
Fig. 4 is an elevation of a short length of telephone cable, the parts being cut away progressively greater distances.
Figure 5:
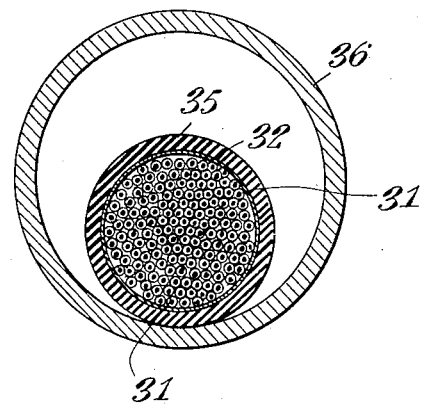
Fig. 5 is a cross section through the cable of Fig. 4 substantially on the line 5—5.

Figs. 4 and 5 show a communication cable embodying the present invention. A plurality of insulated wires 31, for example paper covered copper wires, are cabled together, and conveniently are held together by means of a wrapping 32, for example a paper tape. Over the wrapping 32 is a sheath 35 of elastic insulating material, for example rubber. The spaces within a telephone cable usually are filled with air or other gas, as distinguished from the liquid or viscous oily compounds commonly used in power cables.

The sheathed cable is located inside of a pipe 36 which is somewhat larger than the cable and which has a high resistance to internal pressures. The pipe 36 may be flexible, or it may be rigid, for example a steel pipe. The space between the cable sheath 35 and the wall of the pipe 36 is filled with a fluid which is maintained under pressure during service. Conveniently this fluid may be a gas, for example air.

From the foregoing description is will be apparent that applicant has provided improved cables and cable systems which may be more easily installed and in which the danger of interruption of service by cable breakdown is materially reduced.

It will be understood that wide deviations may be made from the specific embodiment of the invention herein described without departing from the spirit of the invention.

I claim:

1. A high tension cable installation comprising, in combination, a conductor, a wall of porous insulation around the conductor, an elastic, non-metallic sheath comprising a layer of a compound of an olefin polysulfide reaction product enclosing the insulated conductor, a body of fluid insulating material filling the porous insulation and all spaces within the cable sheath, a fluid-tight pipe enclosing the cable, the internal diameter of the pipe being large enough relative to the overall dimension of the cable to permit the cable being drawn into the pipe, and a body of fluid under pressure filling the space between the sheathed cable and the wall of the pipe and pressing against the elastic sheath tending to force the fluid insulating material into the porous insulation under pressure.

2. A high tension cable installation comprising, in combination, a conductor, a wall of porous insulating material around the conductor, a sheath of elastic, non-metallic material enclosing the insulated conductor, the inner surface of said sheath comprising material which is substantially unaffected by oil, a body of oil saturating the cable insulation and filling all spaces within the cable sheath, a pipe enclosing the cable, the internal diameter of the pipe being large enough relative to the overall dimension of the cable to permit the cable being drawn into the pipe, and a body of gas under pressure filling the space between the sheathed cable and the wall of the pipe and pressing against the elastic sheath tending to force the fluid insulating material into the porous insulation under pressure.

3. A cable installation comprising, in combination, a conductor, a wall of insulation around the conductor, a fluid-tight expansible and contractible sheath of material having an elasticity much higher than that of lead enclosing the insulated conductor, a body of fluid insulating material filling all spaces within the cable sheath, a fluid-tight pipe enclosing the cable, the internal diameter of the pipe being large enough relative to the overall dimension of the cable to permit the cable being drawn into the pipe, and a body of fluid under pressure filling the space between the sheathed cable and the wall of the pipe.

4. A cable installation comprising, in combination, an insulated conductor, a fluid-tight expansible and contractible sheath of material having elasticity of the nature of vulcanized rubber enclosing the insulated conductor, a body of fluid insulating material filling all spaces within the cable sheath, a fluid-tight pipe enclosing the cable, the internal diameter of the pipe being large enough relative to the overall dimension of the cable to permit the cable being drawn into the pipe, and a body of fluid under pressure filling the space between the sheathed cable and the wall of the pipe.

5. In an electric cable, the combination of an insulation-enveloped conductor, a sheath of resilient insulating material, a body of fluid insulating compound filling all interstices and spaces within the sheath, a pipe materially larger than the sheathed cable enclosing the cable, and a body of gas under pressure filling the space between the sheathed cable and the wall of the pipe, the gas pressure being sufficiently high so that for all temperatures to which the cable will be subjected there is a positive pressure on the cable sheath tending to collapse the sheath and force the insulating fluid into the conductor insulation.

6. The combination with an electric cable having an expansible and contractible sheath of resilient, non-metallic material, of a body of fluid insulating material within the sheath in quantity sufficient to expand the sheath slightly at normal operating temperatures, a pipe materially larger than the cable enclosing the cable, and a body of fluid under pressure filling the pipe exteriorly of the cable and tending to collapse the cable sheath.

7. The combination with an electric cable having a sheath made of a compound of an olefin polysulfide reaction product, of a body of fluid insulating material within the sheath in quantity sufficient to expand the sheath slightly at normal operating temperatures, a pipe materially larger than the cable enclosing the cable, and a body of fluid under pressure filling the pipe exteriorly of the cable and tending to collapse the cable sheath.

8. A high tension cable installation comprising, in combination, a conductor, an enclosing wall of oil-impregnated insulation, a surrounding impervious sheath of elastic, non-metallic material, a pipe enclosing the insulated and sheathed conductor, the internal diameter of the pipe relative to the cross sectional area of the insulated and sheathed conductor being such as to permit the conductor being drawn into the pipe, a fluid filling the space within said pipe surrounding the insulated and sheathed conductor, and means for maintaining said fluid under sufficiently high pressure to prevent the formation of gaseous spaces in the oil-impregnated insulation.

9. A cable system comprising a fluid tight conduit, an insulated conductor located within the conduit, impregnating fluid for the insulation which changes in volume with temperature changes, a single piece permanently elastic sheath of organic material enclosing the insulation and confining the impregnation fluid, said sheath stretching with increase of pressure of the fluid and self contracting with decrease of pressure, and a fluid which fills the space within the conduit not occupied by the conductor and its covering and exerts radial pressure on the sheath to prevent void formation.

IRVING T. FAUCETT.